W. CZERNIEWSKI.
APPARATUS FOR PRODUCING ANIMATED PICTURES BY THE MOVEMENT OF VEHICLES.
APPLICATION FILED NOV. 29, 1909.
978,854.
Patented Dec. 20, 1910.
3 SHEETS—SHEET 1.
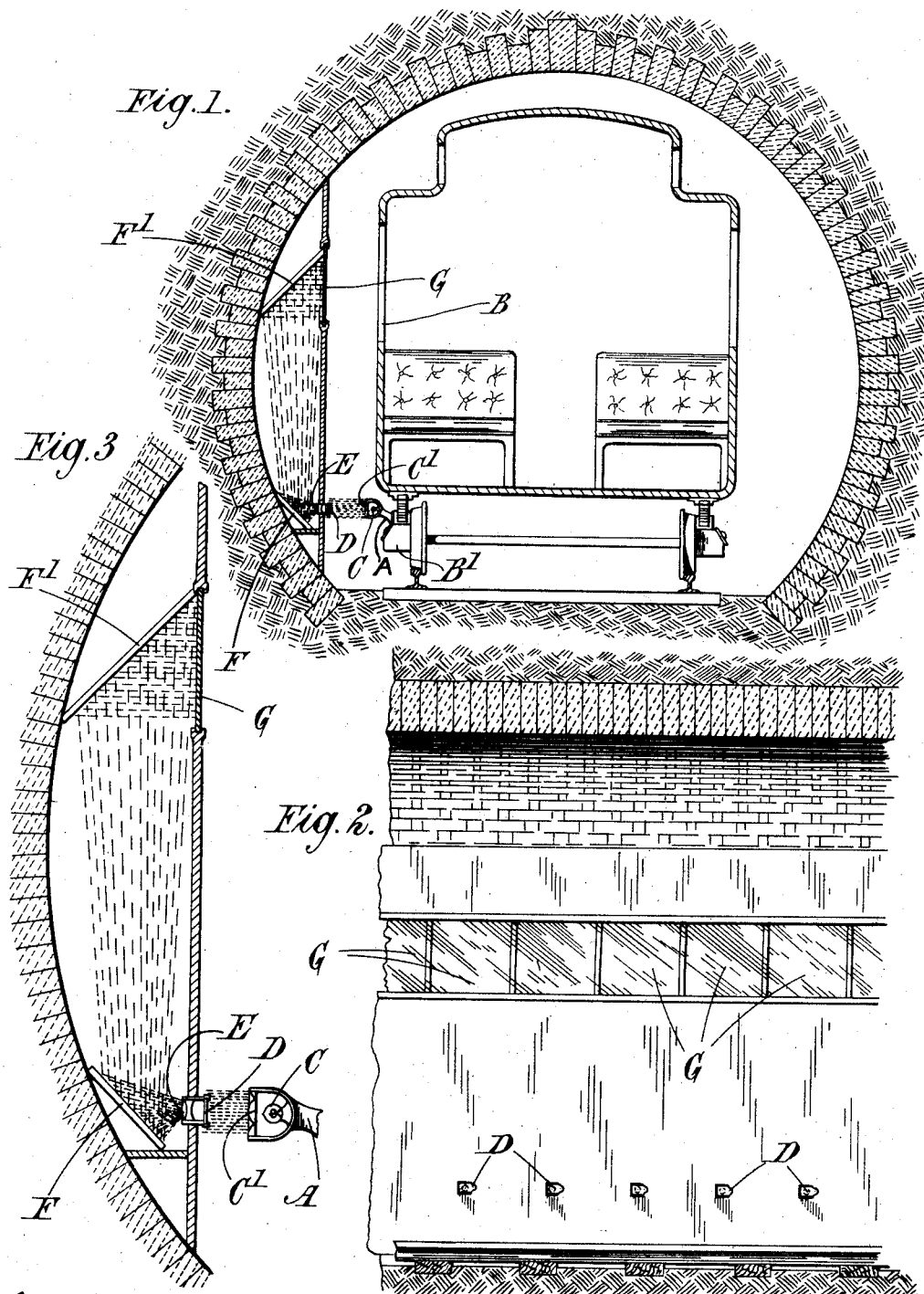

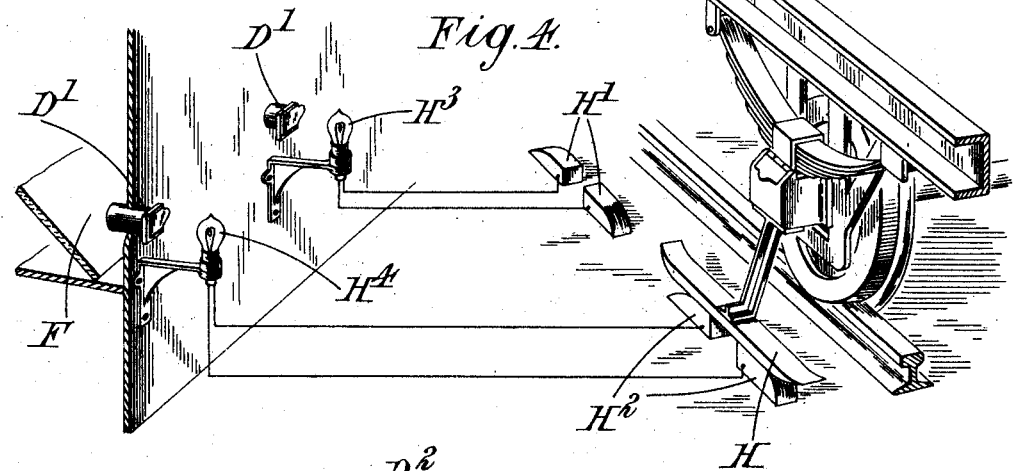
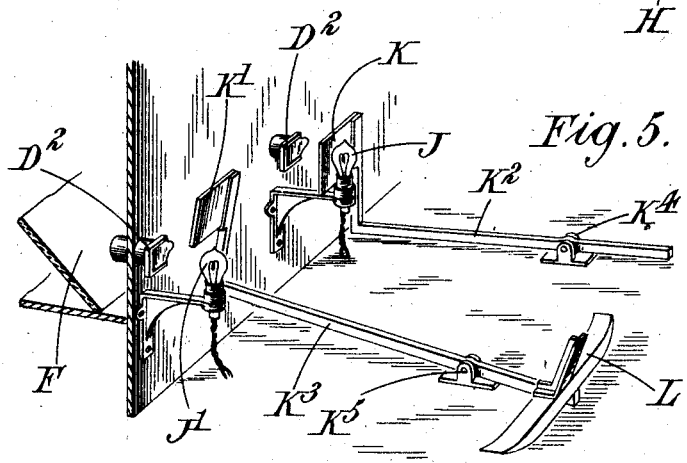
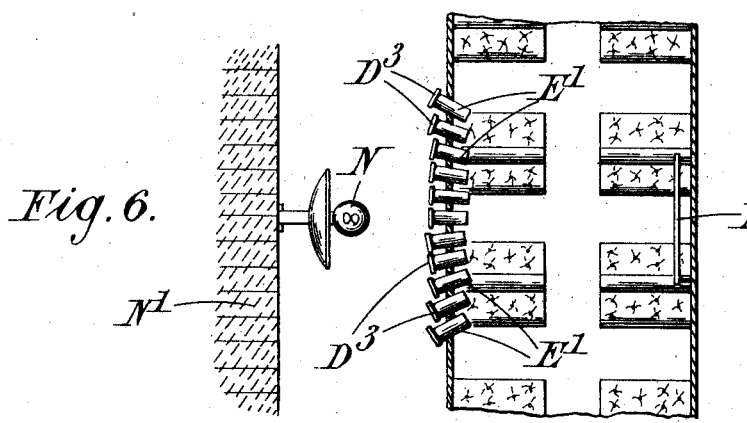

W. CZERNIEWSKI.
APPARATUS FOR PRODUCING ANIMATED PICTURES BY THE MOVEMENT OF VEHICLES.
APPLICATION FILED NOV. 29, 1909.
978,854.
Patented Dec. 20, 1910.
3 SHEETS—SHEET 3.
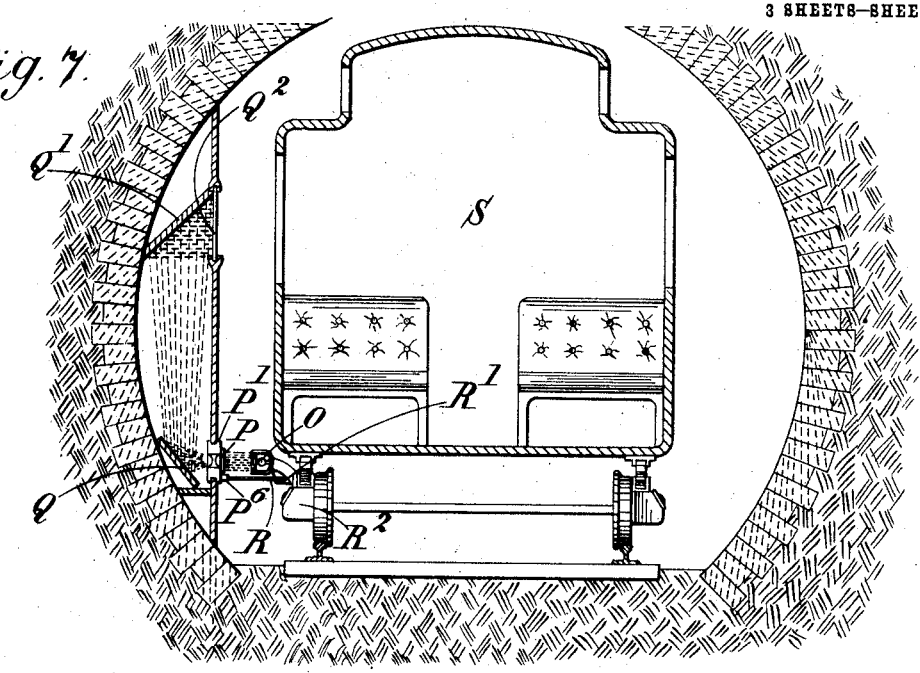
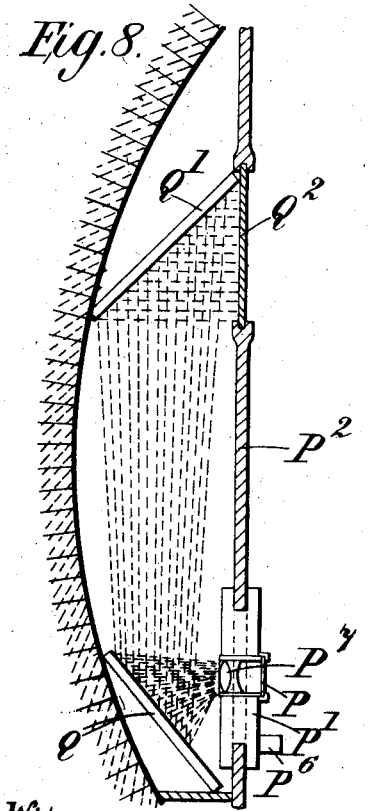
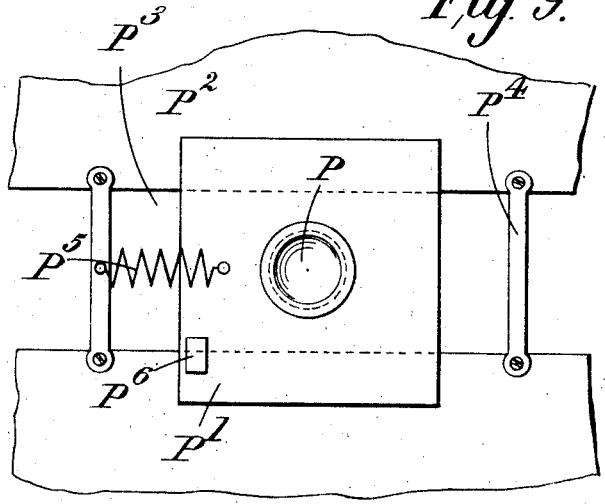
Inventor:
Waclaw Czerniewski
by Henry D. Williams Att'y.
Witnesses:

UNITED STATES PATENT OFFICE.

WACLAW CZERNIEWSKI, OF LONDON, ENGLAND.

APPARATUS FOR PRODUCING ANIMATED PICTURES BY THE MOVEMENT OF VEHICLES.

978,854. Specification of Letters Patent. Patented Dec. 20, 1910.

Application filed November 29, 1909. Serial No. 530,373.

*To all whom it may concern:*

Be it known that I, WACLAW CZERNIEWSKI, a subject of the Czar of Russia, residing at Crouch End, London, N., England, have invented certain new and useful Improvements in Apparatus for Producing Animated Pictures by the Movement of Vehicles, of which the following is a specification.

This invention is for improvements in or relating to apparatus for producing animated pictures by the movement of a vehicle, and has for its object to provide efficient means for presenting such pictures to the occupant of a vehicle while the latter is in motion.

It is well known in animated picture apparatus that one of the elements of the image-producing apparatus must be moved in relation to the other elements.

In carrying out this invention the image-producing apparatus, as heretofore, comprises a source of light, means for directing the light, such as reflectors or lenses, or both, a slide or other transparent picture that is illuminated by the light, and a screen on to which the reproduction of the slide is thrown.

According to this invention there is employed with the animated picture producing apparatus a vehicle to carry the observer and move him relatively to the image producing apparatus and the apparatus is so arranged that this movement of the observer is necessary to produce the effect of a single animated picture.

According to one method of carrying out this invention a vehicle, for instance a railway carriage is employed to carry part of the image producing apparatus, the other part being stationary relatively to the vehicle. For instance the vehicle may carry a source of light whereby a series of progressive pictures (that is pictures wherein the positions of the figures depicted are changed in gradation as is common practice in animated picture production) that are stationary relatively to the vehicle are illuminated each in turn.

Instead of the vehicle carrying the source of light it may merely operate a series of electric switches or cause by mechanical means a series of stationary progressive pictures to be illuminated in turn, the observer however being carried by the vehicle and moved relatively to the image producing apparatus, so that the pictures are made to present by means of the movement of the observer, a single animated picture.

In the accompanying drawings:—Figure 1 is a section through a vehicle and tube railway provided with animated picture producing apparatus according to one method of carrying out this invention. Fig. 2 is a longitudinal section of a portion of the tube railway showing part of the animated picture apparatus disposed therein. Fig. 3 is an enlarged view of the apparatus shown in Fig. 1; Fig. 4 shows in perspective a modified form of the apparatus; Fig. 5 shows another modification; Fig. 6 is a plan of yet another modification; Fig. 7 is a section through a vehicle and tube railway provided with a further modified form of animated picture producing apparatus constructed according to this invention; Fig. 8 shows the left hand side portion of Fig. 7 on a larger scale and Fig. 9 shows a detail of the apparatus on yet a larger scale.

Like letters denote like parts throughout the drawings.

A bracket A is fixed to a part of the vehicle B at a point where it will receive the least oscillation, as for example on the axle box B'. The bracket carries an electric lamp C that is situated at such a level that it can be brought to register with each of a series of progressive pictures D carried on the wall of the tube. The lamp C carries lens C' and the picture on the slide is enlarged by means of a lens E of any well-known form and projected on to a mirror F disposed at an angle of 45° to the slide. From the mirror F the picture is reflected on to another mirror F' disposed at an angle of 90° to the other mirror and at an angle of 45° to a ground-glass screen G. By this means the picture is reflected on to the ground-glass screen which is so disposed at the side of the track that the picture on it can be clearly viewed by an occupant in the vehicle B.

The operation of this apparatus is as follows:—The picture on each slide is in turn illuminated by the rays of light from the lamp C as this is carried past by the vehicle. The image on the picture is enlarged and projected by the lens E on to the mirror F. From there it is reflected on to the mirror F' and thence on to the screen G where it can be seen by an occupant of the vehicle. When the light has passed the slide momentary darkness ensues before the next slide is reached and the result to an occupant carried by the vehicle is the same as that obtained with the well-known form of animated picture apparatus.

In Fig. 4 a modification of this apparatus is shown. The vehicle instead of carrying the source of light carries a contact shoe H that connects successively the elements of a series of pairs of contacts H' H², which are terminals of any suitable source or sources of electric current and to each pair of contacts a lamp H³ or H⁴ is allotted respectively; each lamp is situated opposite a slide D' which is to be illuminated. The arrangement of the slides with their lenses and reflectors is precisely the same as that shown in Fig. 3 and it will be seen that each slide is illuminated in turn as the shoe H connects the elements of each pair of contacts.

This apparatus may again be further modified as shown in Fig. 5, where the slide D² with its lenses and reflectors remains as in Fig. 3. Lamps J J' provided opposite the slides are always giving light. The rays of light are, however, normally shut off from the slides by shields K K' carried by levers K² K³ pivoted at K⁴ K⁵ respectively to fixed supports. The tails of these levers lie in the path of a cam member L carried by the vehicle. As the cam member passes over the tails of the levers the screens are raised each in order so that the light from each lamp is allowed momentarily to pass through the slide D² and lenses allotted to that lamp, producing the same effect as the momentary illumination by the lamp C, Figs. 1–3.

Again, the screen on which the image is to be thrown may be carried by the vehicle itself. This arrangement is shown in Fig. 6 where the screen M is disposed on one side of the vehicle and a series of slides D³ with their lenses E' are arranged on the opposite side of the vehicle. A stationary light N conveniently carried, say by the wall of the tunnel N', is alined to register with the slides D³ and lenses E' as they are carried past it by the vehicle and the slides and lenses are all directed to the screen M so that a series of images will be thrown upon the screen as the vehicle passes the lamp N, thus producing the required animated picture.

If preferred in addition to illuminating each picture momentarily each picture may be carried along with the vehicle for a short interval so that during such interval it remains stationary relatively to the observer in or on the vehicle. Apparatus for an arrangement of this kind is shown in Figs. 7–9. A light O is carried by the vehicle S and alined to illuminate a series of miniature pictures P; one only is shown in the drawings. Each picture P is carried in a frame P' that can slide in a support P².

The support lies parallel with the track of the vehicle and a horizontal slot P³ is provided in it. In this slot the frames P' are mounted and at intervals the slot is crossed by stops P⁴. One of the plates P' lies between each pair of stops P⁴ and is connected to one of the stops by a spring P⁵. On each frame P' is a projecting lug or pin P⁶. The frame in addition to carrying the miniature picture P carries lenses P⁷. Opposite the lenses P⁷ and on the opposite side from the plate P is a reflector Q and opposed to this reflector is a second reflector Q'. The second reflector is opposite a semi-transparent screen Q² that is carried in the upper portion of the support P².

On the vehicle is a resilient rod R carried conveniently by the bracket R' which supports the lamp O and is itself supported by the axle box R².

The operation of this device is as follows:—As the vehicle S advances the resilient arm R, which is alined to strike the lugs or pins P⁶ on the series of frames P' will strike that of the first frame. When the arm strikes the pin the light E is in register with the miniature picture P and lenses P⁷ so that an image of the picture is projected by the lenses on to the reflector Q and thence on to the reflector Q', whence it is thrown on to the semi-opaque screen Q². The frame P' with its picture is carried forward by the yielding arm R against the action of the spring P⁵ until the frame of the picture strikes the forward stop P⁴. This checks any further movement of the picture and the arm being resilient yields so that it disengages itself from the pin P⁶ and is almost immediately brought into contact with the pin P⁶ of the next frame P'. So long as the picture is being carried along with the vehicle its image is visible to the observer on the screen Q² and as all the pictures are progressive the moment one picture is released and another taken up by the arm R a change in the position of the pictures thrown on to the screen Q² will take place. Each picture with its frame P' is returned when released from the arm by its spring P⁵. In the drawing (Fig. 9) the frame and picture are shown partly advanced. The screen Q² is of course long enough to receive the projected images of the whole series of pictures as each picture is in turn carried along with the vehicle and illuminated by the lamp O.

What I claim as my invention and desire to secure by Letters Patent is:—

1. In animated picture apparatus, in combination, a vehicle, a series of progressive pictures, means for successively illuminating the pictures by the movement of the vehicle, and image-producing means coöperative with the pictures for successively presenting images of the pictures to an observer on the vehicle.

2. In animated picture apparatus, in combination, a vehicle, a series of progressive pictures so disposed that they are passed in turn by the vehicle, means for successively illuminating the pictures by the movement of the vehicle, and image-producing means coöperative with the pictures for successively presenting images of the pictures to an observer on the vehicle.

3. In animated picture apparatus, in combination, a vehicle, a series of progressive pictures, means for successively illuminating the pictures by the movement of the vehicle, and magnifying image-producing means coöperative with the pictures for successively presenting images of the pictures to an observer on the vehicle.

4. In animated picture apparatus, the combination of, a vehicle, a series of progressive pictures, means for successively illuminating the pictures by the movement of the vehicle, a screen, and image-producing means coöperative with the pictures for successively projecting images on to the screen.

5. In animated picture apparatus, the combination of, a vehicle, a series of progressive pictures, means for successively illuminating the pictures by the movement of the vehicle, a screen disposed along the side of the track traversed by the vehicle, and image-producing means coöperative with the pictures for successively projecting images on to that part of the screen opposite a given point of the vehicle at the moment of illumination.

6. In animated picture apparatus, in combination, a vehicle, a series of progressive pictures so disposed that they are passed in turn by the vehicle, a source of light carried by the vehicle and arranged to successively illuminate the pictures, and means for successively presenting images of the pictures to an observer on the vehicle.

7. In animated picture apparatus, in combination, a vehicle, a series of progressive pictures so disposed that they are passed in turn by the vehicle, means for successively illuminating the pictures by the movement of the vehicle, a screen, and reflecting means for successively throwing the image of the pictures upon the screen.

8. In animated picture apparatus, in combination, a vehicle, a series of progressive pictures so disposed that they are passed in turn by the vehicle, means for successively illuminating the pictures by the movement of the vehicle, a screen arranged along the path of the vehicle, and reflecting means to throw an image of each picture upon that part of the screen opposite a given point of the vehicle at the moment of illumination.

9. In animated picture apparatus, in combination, a vehicle, a series of progressive pictures so disposed that they are passed in turn by the vehicle, a source of light carried by the vehicle and arranged to successively illuminate the pictures, a screen, and reflecting means for successively throwing the images of the pictures upon the screen.

10. In animated picture apparatus, in combination, a vehicle, a series of progressive pictures so disposed that they are passed in turn by the vehicle, a source of light carried by the vehicle and arranged to successively illminate the pictures, a screen arranged along the path of the vehicle, and reflecting means to throw an image of each picture upon that part of the screen opposite a given point of the vehicle at the moment of illumination.

11. In animated picture apparatus, the combination of a vehicle, a series of progressive pictures so disposed that they are passed in turn by the vehicle, means for supporting each picture in such manner that it can be moved along with the vehicle for a limited distance, and means carried by the vehicle for engaging each picture in turn and carrying it along with the vehicle, substantially as and for the purpose set forth.

12. In animated picture apparatus, the combination of a vehicle, a series of progressive pictures so disposed that they are passed in turn by the vehicle, a frame for each picture, means for supporting each frame in such manner that it can be moved along with the vehicle for a limited distance, and means carried by the vehicle for engaging each frame in turn and carrying it along in its support with the vehicle, substantially as and for the purpose set forth.

13. In animated picture apparatus, the combination of a vehicle, a series of progressive pictures so disposed that they are passed in turn by the vehicle, means for supporting each picture in such manner that it can be moved along with the vehicle a limited distance, means carried by the vehicle for engaging each picture in turn and carrying it along in its support with the vehicle, and a source of light carried by the vehicle and so directed as to illuminate each picture as it is carried along with the vehicle, substantially as and for the purpose set forth.

14. In animated picture apparatus, the combination of a vehicle, a series of miniature progressive pictures so disposed that they are passed in turn by the vehicle, a frame for each picture, means for supporting each frame in such manner that it can be moved along with the vehicle for a limited distance, a lens for each picture carried by the frame situated on that side remote from the vehicle, a source of light on that side of the picture remote from the lens, a screen so placed as to receive a magnified image of the picture projected through the lens, and means carried by the vehicle for engaging each picture in turn and carrying it along with the vehicle, substantially as and for the purpose set forth.

15. In animated picture apparatus, the combination of a vehicle, a series of miniature progressive pictures so disposed that they are passed in turn by the vehicle, a frame for each picture, means for supporting each frame in such manner that it can be moved along with the vehicle for a limited distance, a lens for each picture carried by the frame and situated on that side remote from the vehicle, a source of light carried by the vehicle and so directed as to illuminate each picture as it is carried along with the vehicle, a screen so placed as to receive a magnified image of the picture projected through the lens, and means carried by the vehicle for engaging each picture in turn and carrying it along with the vehicle, substantially as and for the purpose set forth.

16. In animated picture apparatus, the combination of, a vehicle, a series of progressive pictures so disposed that they are passed in turn by the vehicle, means for supporting each picture in such manner that it can be moved along with the vehicle for a limited distance, means carried by the vehicle for engaging each picture in turn and carrying it along with the vehicle, and means for releasing the engagement between the picture and the vehicle as the picture arrives at the limit of its travel, substantially as and for the purpose set forth.

17. In animated picture apparatus, the combination of, a vehicle, a series of progressive pictures so disposed that they are passed in turn by the vehicle, means for supporting each picture in such manner that it can be moved along with the vehicle for a limited distance, means carried by the vehicle for engaging each picture in turn and carrying it along with the vehicle, means for releasing the engagement between the picture and the vehicle as the picture arrives at the limit of its travel, and means for returning each picture to its starting position when released, substantially as and for the purpose set forth.

18. In animated picture apparatus, the combination of, a vehicle, a series of progressive pictures so disposed that they are passed in turn by the vehicle, means for supporting each picture in such manner that it can be moved along with the vehicle for a limited distance, and a yieldingly controlled arm carried by the vehicle and disposed in the path of some part connected with each picture the control of the arm being sufficiently strong to allow the arm to carry the picture forward until the latter arrives at the limit of its movement when the yielding control allows the arm to be deflected to disengage it from the picture, substantially as and for the purpose set forth.

19. In animated picture apparatus, the combination of, a vehicle, a series of progressive pictures so disposed that they are passed in turn by the vehicle, means for supporting each picture in such manner that it can be moved along with the vehicle for a limited distance, a yieldingly controlled arm carried by the vehicle, and disposed in the path of some part connected with each picture the control of the arm being sufficiently strong to allow the arm to carry the picture forward until it arrives at the limit of its movement when the yielding control allows the arm to be deflected to disengage it from the picture, and a spring control for the picture whereby it is returned to the starting point when released from the yieldingly controlled arm, substantially as and for the purpose set forth.

20. In animated picture apparatus, the combination of, a vehicle, a series of progressive pictures so disposed that they are passed in turn by the vehicle, guides supporting each picture and so disposed that they allow movement in the direction of the travel of the vehicle, stops on the guides to limit the degree of travel permitted to each picture, and means carried by the vehicle for engaging each picture in turn and carrying it along with the vehicle, substantially as and for the purpose set forth.

In testimony whereof I have signed my name to this specification in the presence of two subscribing witnesses.

WACLAW CZERNIEWSKI.

Witnesses:
 A. M. HAYWARD,
 RONALD S. DOLLEYMORE.